(12) United States Patent
Heinrichs et al.

(10) Patent No.: US 11,047,416 B2
(45) Date of Patent: Jun. 29, 2021

(54) FASTENING CLIP (71) Applicant: BÖLLHOFF VERBINDUNGSTECHNIK GmbH, Bielefeld (DE)

(72) Inventors: Heinrich Heinrichs, Vlotho (DE); Wolfgang Hesse, Rietberg (DE); Stefan Gruss, Enger (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 276 days.

(21) Appl. No.: 16/322,163

(22) PCT Filed: Jul. 19, 2017

(86) PCT No.: PCT/EP2017/068219
§ 371 (c)(1),
(2) Date: Jan. 31, 2019

(87) PCT Pub. No.: WO2018/028954
PCT Pub. Date: Feb. 15, 2018

(65) Prior Publication Data
US 2019/0186523 A1 Jun. 20, 2019

(30) Foreign Application Priority Data
Aug. 10, 2016 (DE) .......................... 202016104408.1

(51) Int. Cl.
F16B 21/08 (2006.01)
F16B 5/06 (2006.01)
(Continued)

(52) U.S. Cl.
CPC .............. F16B 21/082 (2013.01); F16B 5/06 (2013.01); F16B 19/004 (2013.01);
(Continued)

(58) Field of Classification Search
CPC .......... F16B 5/06; F16B 5/065; F16B 19/004; F16B 21/082; F16B 21/084; F16B 21/086;
(Continued)

(56) References Cited

U.S. PATENT DOCUMENTS 2,186,747 A   1/1940 Walbin
2,515,827 A * 7/1950 Howard ................ F16B 5/0642
                                                     52/714

(Continued)

FOREIGN PATENT DOCUMENTS

CN    1246095 A     3/2000
CN    101251142 A   8/2008
(Continued)

OTHER PUBLICATIONS

English translation of the International Preliminary Report on Patentability for PCT/EP2017/068219 dated Feb. 12, 2019, (8 pages).

(Continued)

Primary Examiner — Roberta S Delisle
(74) Attorney, Agent, or Firm — Reising Ethington P.C.; Matthew J. Schmidt (57) ABSTRACT To fasten a first component to a second component, a fastening clip has an integral, elongated structure with a first and a second fastening end. The first fastening end comprises an at least one-armed independent latching structure. The second fastening end is formed by a resilient clamp. The first and second latching structure act on an intermediate support structure. To connect the two components, the latching structure is latched in a component opening in a first component, and the second component is fastened between (Continued)

the support structure and a spring loop of the resilient clamp with the assistance of a cutout or a slot that is open on one side.

19 Claims, 5 Drawing Sheets

(51) Int. Cl.
    *F16B 33/00*    (2006.01)
    *F16B 19/00*    (2006.01)
    *B60R 13/02*    (2006.01)

(52) U.S. Cl.
    CPC .......... *F16B 21/086* (2013.01); *F16B 33/004* (2013.01); *B60R 13/0206* (2013.01); *F16B 21/08* (2013.01)

(58) Field of Classification Search
    CPC .... F16B 33/004; F16B 21/08; Y10S 411/913; Y10T 24/309; Y10T 24/42
    USPC .......................................... 411/508, 509, 510
    See application file for complete search history.

(56) References Cited

U.S. PATENT DOCUMENTS

| | | | |
|---|---|---|---|
| 3,777,052 A * | 12/1973 | Fegen ................... | H05K 7/142 174/138 D |
| 3,816,883 A | 6/1974 | Dzus, Sr. et al. | |
| 6,253,423 B1 | 7/2001 | Friedrich et al. | |
| 6,334,750 B1 * | 1/2002 | Hsieh ...................... | F16B 5/065 165/80.3 |
| 6,666,640 B1 * | 12/2003 | Hsieh ...................... | F16B 5/065 165/80.3 |
| 7,878,749 B2 * | 2/2011 | Edland .................. | F16B 21/086 411/508 |
| 8,883,059 B2 | 11/2014 | Lewis et al. | |
| 9,500,210 B2 | 11/2016 | Johnson et al. | |
| 9,982,694 B2 | 5/2018 | Scroggie et al. | |
| 2004/0052575 A1 * | 3/2004 | Draggoo ............... | F16B 21/082 403/298 |
| 2007/0166127 A1 | 7/2007 | Scroggie et al. | |
| 2007/0217890 A1 * | 9/2007 | Scroggie ................ | F16B 5/123 411/508 |
| 2007/0258795 A1 * | 11/2007 | Nakazato ............... | F16B 21/086 411/508 |
| 2008/0050202 A1 * | 2/2008 | Liu ....................... | F16B 5/0657 411/508 |
| 2008/0201920 A1 | 8/2008 | Jatzke | |
| 2011/0243688 A1 | 10/2011 | Klein et al. | |
| 2012/0261942 A1 | 10/2012 | Benedetti et al. | |
| 2013/0272783 A1 | 10/2013 | Ramsauer | |
| 2015/0023759 A1 | 1/2015 | Klopfenstein, II | |
| 2018/0266460 A1 | 9/2018 | Scroggie et al. | |

FOREIGN PATENT DOCUMENTS

| | | |
|---|---|---|
| CN | 103080567 A | 5/2013 |
| CN | 104854355 A | 8/2015 |
| DE | 102006027869 A1 | 12/2007 |
| DE | 202008009210 U1 | 12/2008 |
| DE | 102009033804 A1 | 1/2011 |
| DE | 112013000334 T5 | 8/2014 |
| EP | 2689146 B1 | 5/2016 |
| FR | 2993328 A1 | 1/2014 |
| WO | WO2010051987 A1 | 5/2010 |
| WO | WO2013179110 A1 | 12/2013 |
| WO | WO2014099444 A1 | 6/2014 |

OTHER PUBLICATIONS

CN Office Action for CN Application No. 201780046591.8 dated Mar. 2, 2020 (8 pages).

Written Opinion & International Search Report for PCT/EP2017/068219 dated Oct. 24, 2017, 11 pages.

* cited by examiner

FASTENING CLIP

1. TECHNICAL FIELD

The present disclosure relates to a fastening clip for fastening a first and a second component, a connection of a first and a second component with the assistance of the fastening clip, as well as a production method for the aforementioned fastening clip.

2. BACKGROUND

A plurality of different constructions of fastening clips is known in the prior art. In addition to connecting a plurality of components, these fastening clips frequently also fulfill additional functions. These functions include dampening the connection between two components, displaying the produced connected state, or securing the connection against undesired release.

For example, DE 20 2008 009 210 U1 discloses a fastening clip in the form of a connection arrangement. This connection arrangement consists of at least three elements that necessarily must be mounted in each other to establish a connection. In addition to the production effort, such fastening clips are time-consuming during installation which leads to disadvantageously high cycle times, such as in the automotive branch.

DE 11 2013 000 334 T5 describes an airbag anchoring clip arrangement. This anchoring clip arrangement is designed to be securely anchored to a structure. In so doing, it is key for the arrangement to have at least one verification element to provide a confirmation of when the plurality of anchoring elements is reliably anchored to a structure. Such fastening arrangements are justified especially with safety-relevant fastenings. If however a robust fastening of at least two parts together is at issue which should be feasible with a small expenditure of time, the verification elements that are used here represent excessive effort.

FR 2 993 328 describes a fastening clip consisting of an elongated structure with two fastening ends. These fastening ends each establish a connection to a component. Between the fastening ends is a resilient arrangement with a variable length with the assistance of which tolerances between the two components connected to each other can be compensated, or arising vibrations can be dampened.

Fastening clips frequently comprise a locking structure or a resilient clamp. An example of a resilient clamp is disclosed in EP 2 689 146 B1. This resilient clamp is formed by two crossing flexible legs. These flexible legs are configured such that one flexible leg engages in an elliptical opening of the other flexible leg and is movably arranged therein. Accordingly, a scissors-like arrangement exists that does not join two legs by a fixed pivot point, but rather by a movable sliding connection. In this arrangement, it is disadvantageous that components to be connected to each other can only be pushed onto the fastening clip and locked thereto from one direction. This results in assembly requirements that also restrict the field of use of the fastening clip.

Another group of fastening clips is described in WO 2010/051987 A1, WO 2013/179110 A1, U.S. Pat. No. 8,883,059 B2 and WO 2014/099444 A1. This type of fastening clip consists of an elongated structure with two fastening ends arranged opposite each other. Whereas one fastening end is formed by arrow-like latching arms that latch in a component opening, the opposing fastening end represents a type of head of the fastening clip. This head has for example the shape of a plate-like flange that is arranged on a middle axial bar of the fastening clip. A slot in a component that is for example open on one side such as a cell can thus be pushed onto the axial bar and is held in this position by the plate-like flange. In so doing, this fastening end only forms a form-fitting connection with the component arranged thereupon. Different designs of the fastening clip provide a plate-like support structure between the two fastening ends arranged opposite each other. Whereas the latching structure braces a component against a possible seal on the plate-like support structure, the support structure only forms part of the form-fitting connection without exerting force with respect to the plate-like flange.

The last-described fastening clip has for example the disadvantage that a form-fitting connection on the one hand and a frictional connection on the other hand are combined with each other. These do not have a sufficient fastening quality in all applications to yield an appropriate life of the established connection.

It is therefore an object of the present invention to provide an alternative to the known fastening clips that connects at least two components reliably with each other.

3. SUMMARY

The above object may be achieved by a fastening clip, by a connection between a first and a second component with the assistance of the fastening clip, by a production method for the aforementioned fastening clip, as well as by a connection method as set forth in this disclosure. Further embodiments and further developments are set forth in the following description, the accompanying drawings and the claims.

The fastening clip serves to fasten a first component to a second component. The fastening clip consists of an integral, elongated structure with a first and a second fastening end in which the first fastening end forms an at least one-armed independent latching structure, and the second fastening end forms a resilient clamp that each act on an intermediate support structure. The fastening clip of the present disclosure combines two fastening ends arranged opposite each other into a single-part structure made of plastic. These fastening ends each realize a combined frictional and form-fitting connection with a component arranged thereupon. Whereas the form fit is basically realized by the latching structure on the first fastening end and the resilient clamp on the second fastening end each in combination with a central, elongated axial bar, a force fit is achieved by the effect of the two fastening structures on the intermediate support structure. Since the resilient clamp may press the adjacently arranged component against the support structure, it provides additional securing and maintenance of the form-fitting connection. In the same manner, at least one resilient latching bar of the latching structure causes the latching structure to exert force on the adjacently arranged component toward the support structure arranged in the middle. In this manner, the existing form fit may be supported, and the maintenance of the established connection is secured by the force fit. To this end, the support structure can be shaped as desired as long as it provides sufficient contact surface or contact structures in the supporting area of the first and second component.

According to a further embodiment of the fastening clip, the clamp comprises at least one closed spring loop that encloses an area that may be parallel to a longitudinal axis of the fastening clip.

In contrast to the prior art, no spring arms are used as a clamp. Instead, a closed structure, in this case a peripheral, closed plastic strip is used in order to deflect spring tension from the dimensional stability of this structure to a component to be fastened. The shape of the spring loop works together with the material properties of the employed plastic. The basic goal is to only nondestructively deform the spring loop such that the elastic material properties are combined with the dimensional stability of the spring loop in this case. In so doing, the effort of the spring loop to return to the original shape after deformation is exploited. Since the spring loop may run in a circle, oval, ellipse, etc. within a plane, it simultaneously encloses an area. According to a further embodiment, this plane is also arranged parallel to the longitudinal axis of the fastening clip. In other words, the centrally arranged axial bar of the fastening clip may lay within the plane formed by the at least one spring loop. It also may be preferable to arrange the enclosed area in a nonparallel manner, i.e., at an angle, to the longitudinal axis of the fastening clip as long as the necessary pressure can be provided by the spring loop for a frictional connection.

The interior of the at least one spring loop may have a limiting bar that preferably runs parallel to the longitudinal axis of the fastening clip, and with which compression of the spring loop is limited to a maximum.

This limiting bar may be tailored to the material properties of the plastic material used to create the spring loop. In particular, the limiting bar prevents the stress on the material of the spring loop from exceeding an elastic deformation range during the compression of the spring loop. In this manner, the spring loop inserted in the fastening clip is not damaged, and the fastening clip is also not weakened thereby. Consequently, the limiting bar may be arranged parallel to the compression and/or deformation direction of the spring loop, i.e., generally parallel to the longitudinal axis of the fastening bar. Depending on the material used to create the spring loop, the length of the limiting bar is designed differently.

According to another embodiment, the fastening clip comprises a cross bar on the second fastening end on which at least two spring loops are arranged opposite each other. In this context, it is also conceivable to only arrange one spring loop or more than two spring loops on the aforementioned cross bar, or only on the axial bar. According to another embodiment, it is also conceivable to arrange more than one cross bar which then bears one, two or a different number of spring loops. It also may be preferable for the one or more spring loops to be connected to the second fastening end by an angled arrangement, or a non-bar-like construction.

According to another embodiment of the fastening clip, the support structure is designed like a plate, or at least flat on one side, or on both sides, and has a sealing structure at least on one side. The sealing structure can have different designs that may be created by means of injection molding. According to another embodiment, the sealing structure is subsequently fastened to the integrally produced fastening clip, in particular to the support structure. According to another alternative of the present disclosure, the fastening clip is produced in a two-component injection molding method. In this case, the sealing structure is molded onto the support structure after producing the integral fastening clip with the support structure. In order to achieve the sealing properties that are desired and preferred here, the sealing structure consists of a different plastic than the integral structure of the fastening clip.

It also may be preferable for the latching structure on the first end of the fastening clip to comprise at least one latching bar arranged at an acute angle relative to the longitudinal axis of the fastening clip that comprises an insertion chamfer and an undercut on a free end, may be an axial undercut, relative to a releasing direction of the latching structure. The acute-angled arrangement of the latching structure arises because the at least one latching bar is arranged obliquely in the direction of the support structure. The insertion and latching of the latching structure in a component opening is thereby supported since the latching bar(s) themselves provide an insertion aid with the assistance of the slope. To prevent the latching structure from easily releasing from a component opening, the free end of the resiliently arranged latching bar is designed flat, or stepped, or adapted in shape to the component opening. This ensures that the latching structure can be inserted into a component opening at least until the at least one latching bar snaps, completely or partially, into the component opening radially to the outside at the end of the process of inserting the latching structure in order to prevent movement of the component in the direction of release from the latching structure.

According to another embodiment of the fastening clip, the latching structure is designed such that the component attached thereto is latched to the support structure against the sealing structure, i.e., pressed against said sealing structure by the latching.

The present disclosure also comprises a first and a second component that are connected to each other by the fastening clip described above according to one of its embodiments.

Moreover, the present disclosure comprises a production method for the fastening clip that has the following steps: Providing an injection mold that dictates a single-part structure for the fastening clip, wherein the fastening clip consists of an integral, elongated structure with a first and a second fastening end in which the first fastening end forms an at least one-armed independent latching structure, and the second fastening end forms a resilient clamp that each act on an intermediate support structure, and injection molding the fastening clip from only one plastic. It also may be preferable in the context of the production method to fasten a sealing structure to the support structure that may have been produced by a separate injection molding method, or another suitable method. Alternatively thereto, it also may be preferable to injection mold the support structure in the context of a two-component injection molding method so that the sealing structure is fastened to the support structure.

Moreover, the present disclosure comprises another production method for the fastening clip that has the following steps: Providing a data model that dictates a single-part structure for the fastening clip, wherein the fastening clip consists of an integral, elongated structure with a first and a second fastening end in which the first fastening end forms an at least one-armed independent latching structure, and the second fastening end forms a resilient clamp that each act on an intermediate support structure, and generating the fastening clip based on the data model from only one plastic by an additive method, in particular 3-D printing.

4. BRIEF DESCRIPTION OF THE ACCOMPANYING DRAWINGS

The present disclosure is explained in greater detail using the accompanying drawings. In the following.

5. DETAILED DESCRIPTION

Figure 1:
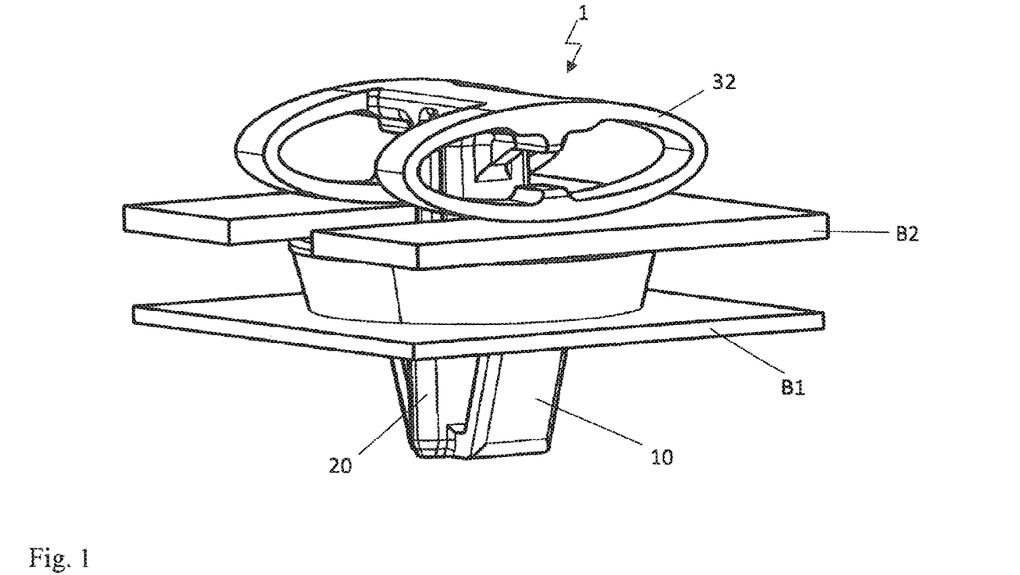
FIG. 1 shows a perspective view of the connection of a first and a second component with the assistance of an embodiment of the fastening clip.

The fastening clip 1 establishes a connection between a first component B1 and a second component B2. These components B1, B2 each may be coupled to the fastening clip 1 with the assistance of a combined frictional and form-fitting connection. This connection is established by the first fastening end 10 and by the second fastening end 30. These are integrally formed with a central axial bar 20 so that the fastening clip 1 represents an elongated construction.

The first fastening end 10 may consist of at least one latching bar 12 that forms a latching structure. The at least one latching bar 12, two latching bars 12 in the present preferred embodiment, may be connected at one end to the axial bar 20. In order to facilitate insertion and latching in a component opening O, the latching bars 12 are arranged at an acute angle relative to the axial bar 20. Due to this arrangement, the latching bars 12 also provide an insertion chamfer 14. During the insertion of the latching structure 10 in the component opening O, the edge of the component opening O slides on the insertion chamfer 14 and thereby presses the latching bar 12 toward the axial bar 20.

Once the first component has overcome a latching edge 16 on the latching bar 12, the latching bar 12 snaps outward, i.e., distant from the axial bar 20. The first component B1 is thereby pressed beyond a preferred pressing edge 18 toward a support structure 50 arranged between the first 10 and the second fastening end 30.

Figure 5:
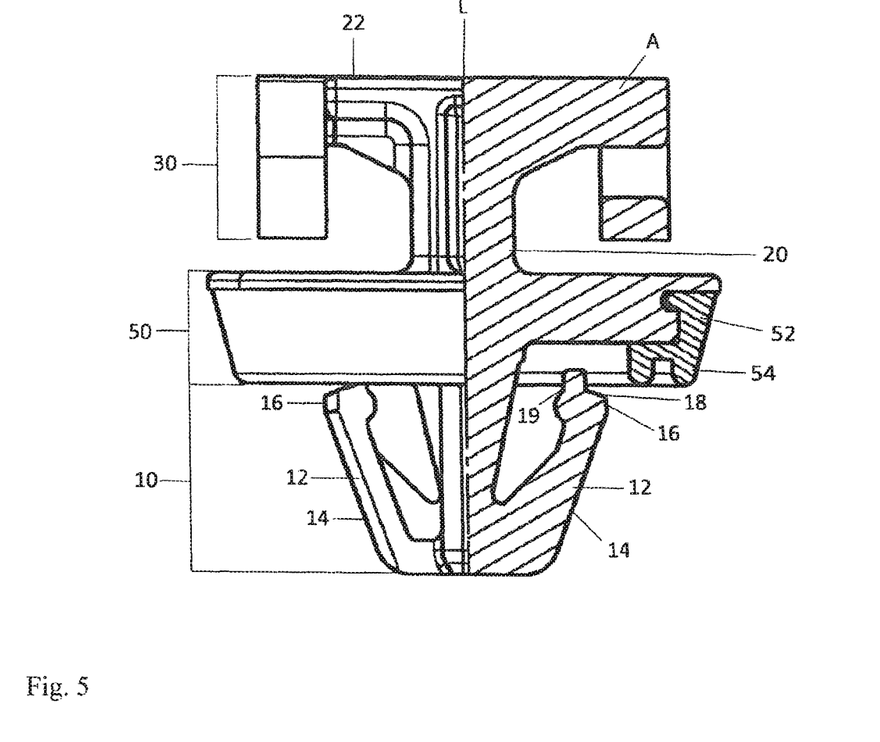
FIG. 5 shows a lateral, partially sectional view of the fastening clip from FIG. 1.
Figure 6:
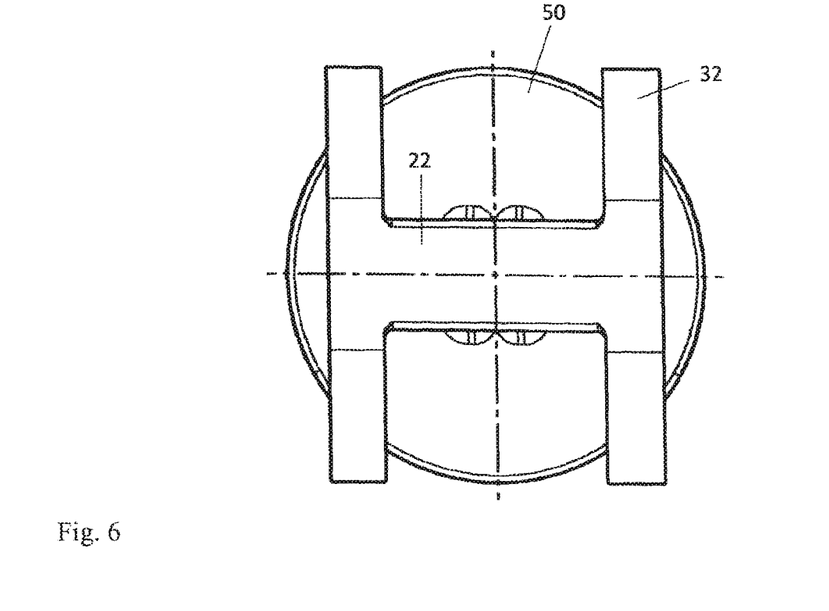
FIG. 6 shows a view from above of the fastening clip from FIG. 1.
Figure 7:
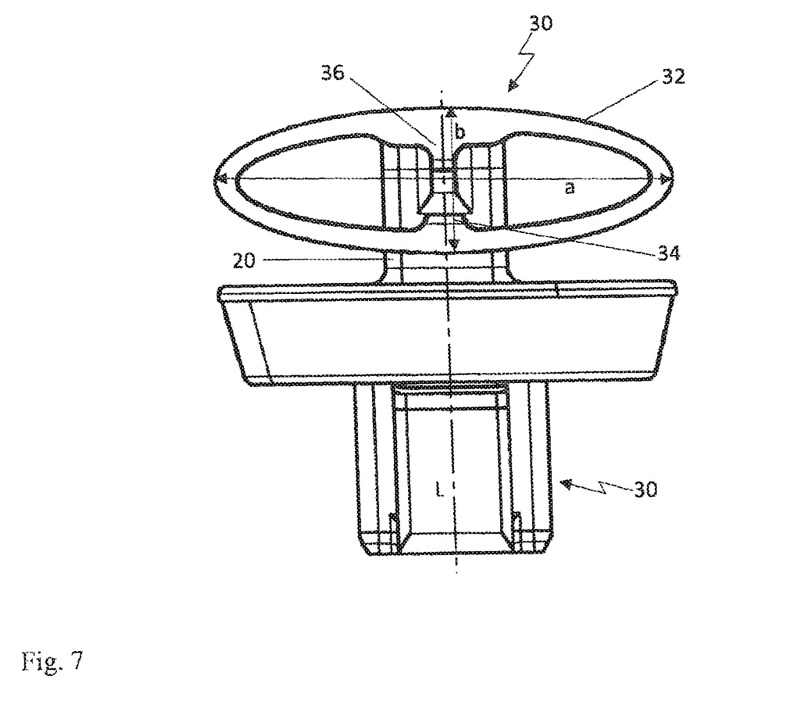
FIG. 7 shows a side view of the fastening clip from FIG. 1.

As can be seen with reference to FIG. 5, the pressing edge 18 may be arranged at an obtuse angle relative to the longitudinal axis L of the fastening clip 1. If the inner edge of the component opening O of the first component B1 accordingly abuts the pressing edge 18 while the latching bar 12 springs outward back to its home position, the first component B1 is then pressed toward the support structure 50. If the pressing edge 18 is arranged transversely or at an acute angle relative to the longitudinal axis L, then the pressing edge 18 only forms an undercut as is also the case with an obtuse-angled arrangement. This undercut counteracts a potential withdrawal force in the withdrawal direction of the fastening clip 1 from the component opening O, i.e., opposite the direction of insertion into the component opening O. Only when the latching bars 12 are manually or automatically moved toward the axial bar 20 can the independent latching structure 10 be released from the opening O of the first component B1.

Figure 2:
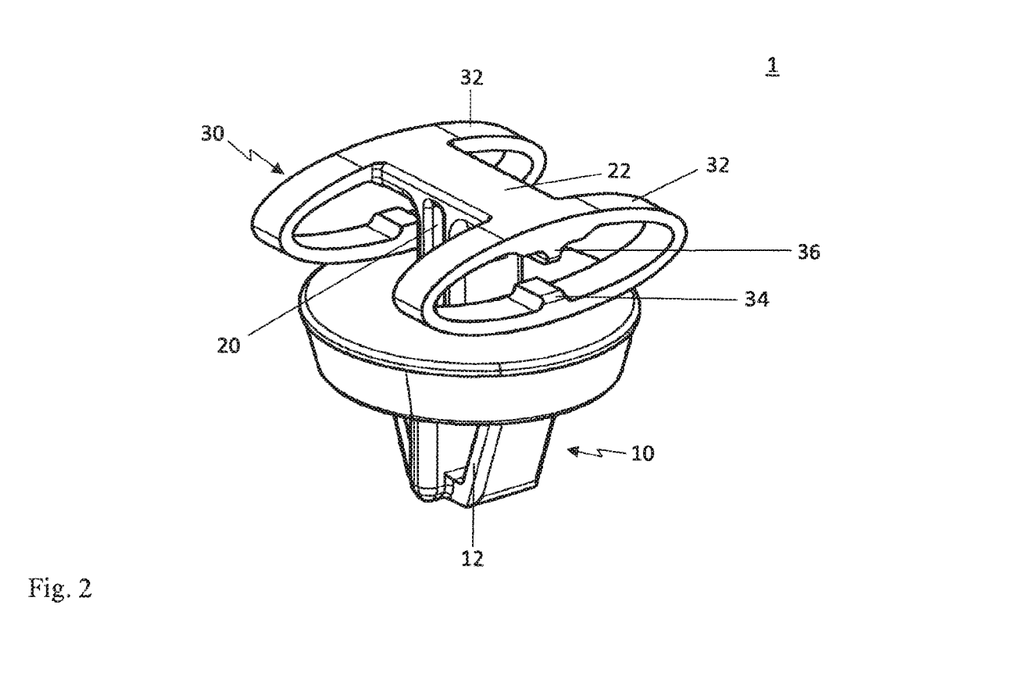
FIG. 2 shows a perspective representation of the fastening clip from FIG. 1.
Figure 3:
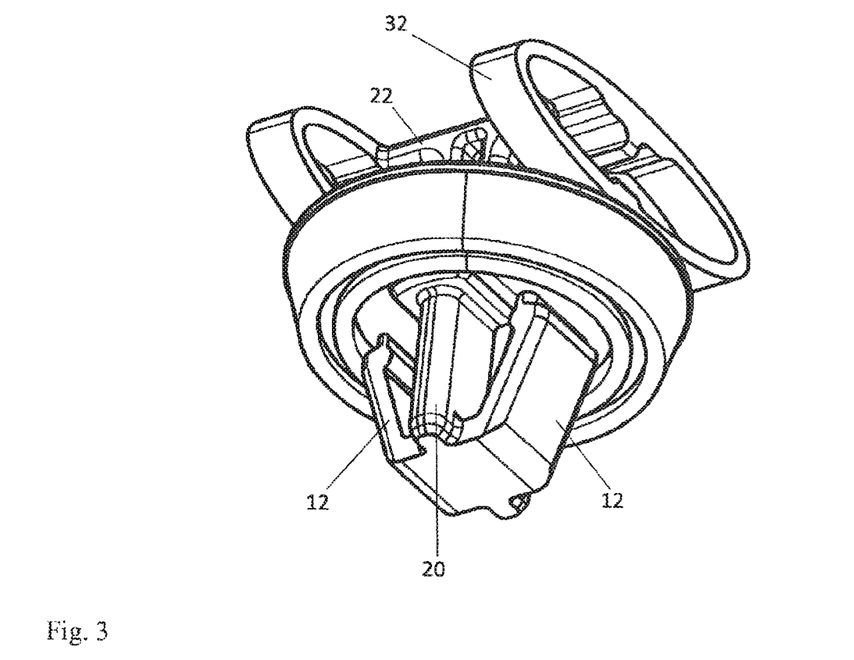
FIG. 3 shows a perspective representation of the fastening clip from FIG. 1.
Figure 4:
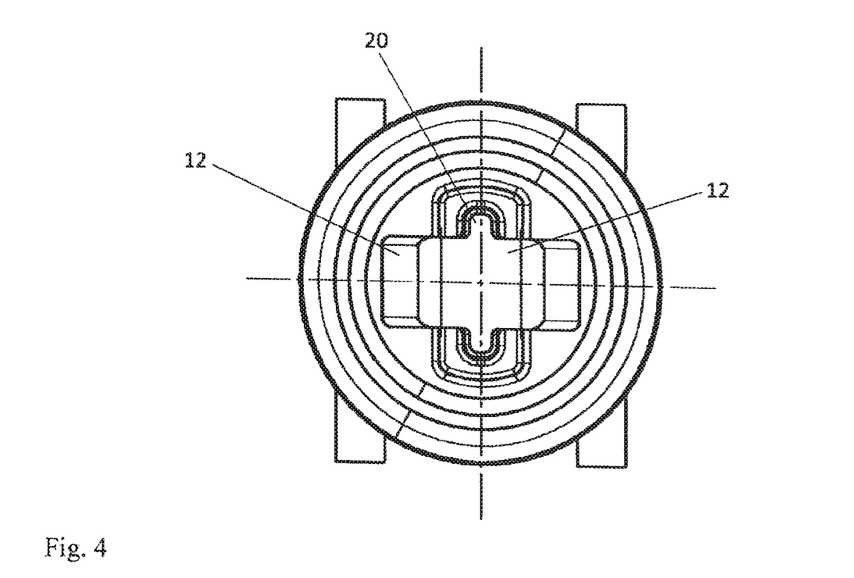
FIG. 4 shows a view from below of the fastening clip from FIG. 1.
Figure 8:
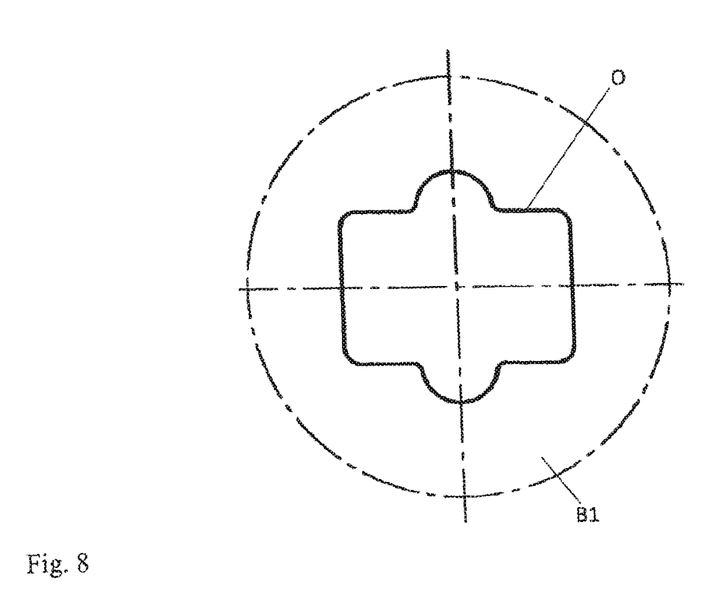
FIG. 8 shows an embodiment of an opening in the component for inserting and therein locking the fastening clip from FIG. 1.

As can be seen with reference to FIGS. 2 and 3, the latching bars 12 are designed flat. They therefore may be combined with an angled opening O (see FIG. 8) in order to fixate the fastening clip 1 within the component opening O against rotation. Correspondingly, the opening O may represent a keyhole that can only be used by latching structures that are adapted thereto. Such a keyhole has the advantage that the fastening clip 1 is secured in its position and angled alignment. The connection may be prepared in this manner to the second component B2 by the second fastening end 30.

An axial support bar 19 provides additional positional stability of the fastening clip 1 in the component opening O. After the fastening clip 1 has been successfully inserted in the component opening O, said bar abuts the inside of the component opening O. This also stabilizes the position of the fastening clip 1 in the X-Y plane relative to the first component B1.

It also may be preferable to design the component opening O round, oval, elliptical, polygonal or irregularly angled. Turning the fastening clip 1 within the plane of the first component B1 would only be permitted by a rotationally symmetrical shape of the component opening O. This may be in the same manner as a non-rotationally-symmetrical shape that fixes a position of the fastening clip 1 in the first component B1.

The intermediate support structure 50 may be designed plate-shaped. Due to its arrangement and stability, it ensures sufficient opposing force for frictionally holding the first component B1 between the latching structure 10 and the support structure 50.

Moreover, a sealing structure 52 may be fastened to the support structure 50. The sealing structure 52 is a separate injection molded part according to one embodiment (see below), the material of which has greater elasticity than the remaining fastening clip 1. According to a further embodiment, this sealing structure 52 is produced in a separate injection molding method and then fastened to the support structure 50. The type of fastening can differ. It must only be ensured that the sealing structure is reliably held by the support structure 50. Correspondingly, the sealing structure 52 may be held by adhesion, latching or clamping to the support structure 50.

According to another embodiment, the fastening clip 1 is produced with the assistance of a known two-component injection molding method. For this, the widely hatched part A of the fastening clip 1 (see FIG. 5) is formed in an injection mold with a first shot of plastic. With a second shot of plastic that introduces a plastic with a greater elasticity than the plastic of the first shot of plastic into the injection mold, the sealing structure 52 may be generated in the same injection mold. This is the tightly hatched region B in FIG. 5. Subsequently, the fastening clip 1 is demolded with the sealing structure 52 from the injection mold.

In the direction of the latching structure 10, the sealing structure 52 may have axially projecting peripherally arranged sealing lips 54. These can be compressed in the direction of the support structure 50. The component opening O which may be surrounded by the sealing structure 52 in a fastened state is thereby sealed by the compressed sealing structure 52. Moreover, the compressible sealing structure 52 ensures that first components B1 are reliably held with a certain thickness tolerance between the latching bars 12 and the support structure 50.

The second fastening end 30 is arranged opposite from the first fastening end 10. It consists of at least one closed spring loop 32. The spring loop 32 is elastically compressible in a radial direction and returns to its initial configuration when released. The deformability and the elastic spring properties are based on the shape of a closed loop and the material properties of the plastic used. In its relaxed configuration, it therefore may be preferable to design the spring loop 32 elliptically, or round, or oval, or polygonal. The area enclosed by the spring loop 32 is arranged parallel or at an angle relative to the longitudinal axis L of the fastening clip 1. According to a further embodiment, the area is provided parallel to the longitudinal axis. According to another embodiment, the enclosed area of the spring loop 32 encloses an acute angle with the longitudinal axis L that is open toward the support structure 50.

The at least one spring loop 32 may be shaped elliptically, and its long main axis "a" is arranged transverse to the longitudinal axis L of the axial bar 20. It also may be preferable for the spring loop to be connected by the cross bar 22 to the axial bar 20 at an end of the shorter minor axis "b" facing away from the support structure 50. According to the embodiments described above, the minor axis "b" is arranged parallel or at an acute angle relative to the longitudinal axis L of the fastening clip 1. The spring properties of the spring loop 32 parallel to the longitudinal axis L can be specifically adjusted by adjusting the thickness of the spring loop 32 in a radial direction, i.e., the thickness of the material strip that forms the spring loop, as well as by adjusting the width of the spring loop transverse to its thickness, and with the length of the main axis "a" and minor axis "b". These structural properties may be supplemented by the selection of the plastic of which the integral fastening clip 1 consists.

In regard to the selection of the material of the fastening clip 1, the following plastics may be preferred. These are used with a fiberglass content of up to 30% according to various embodiments of the present invention. The following stable plastics may be used for producing the fastening clip 1: PA plastics (polyamide), polyoxymethylene (POM) plastics, acrylonitrile-butadiene-styrene copolymers (ABS), polycarbonate (PC) plastics, polyetherimide (PEI) plastics, and polypropylene (PP) plastics. In regards to these plastics, it should be noted that they may not be deformed beyond their elasticity limit. Such a deformation would cause the fatiguing or even failure of the corresponding plastic part, in this case the spring loop 30 or latching arms 12.

In order to limit the spring path parallel to the minor axis "b" taking into account the elasticity limit of the plastic used, at least one limiting bar 34 is provided within the spring loop 32. This limiting bar 34 is provided as a single part or is formed by two limiting bars 34, 36 arranged opposite each other. According to different embodiments of the present disclosure, the limiting bars 34, 36 extend parallel or at an acute angle to the longitudinal axis L. Once the second component B2 is held between the support structure 50 and the spring loop 32, the spring loop 32 may be compressed parallel to the minor axis "b" when the minor axis "b" is arranged parallel to the longitudinal axis L. With the assistance of the limiting bars 34, 36, fatiguing of the material of the spring loop 32 is prevented or at least reduced.

It also may be preferable to arrange two or four spring loops 32 on the fastening clip 1. In the case of four spring loops 32, another cross bar would be provided (not shown) that would be arranged transverse to the cross bar 22.

Figure 9:
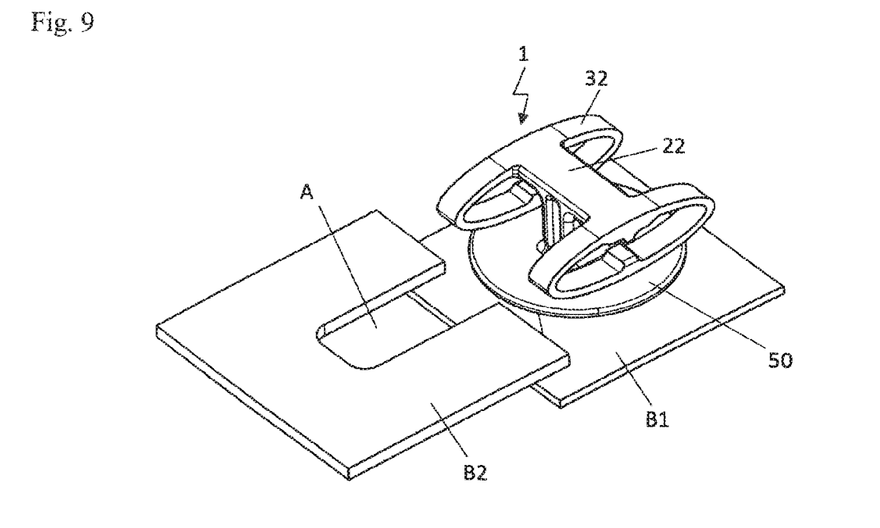
FIG. 9 shows a perspective representation of an intermediate step for producing a connection between two components with the assistance of the fastening clip.

To produce a connection between two components B1, B2, first the fastening clip 1 is latched in the component opening O of the first component B1 with the assistance of the latching arms 12. The component B1 may be a body structure in a motor vehicle, a support structure, or the like.

Then the second component B2 is fastened with the assistance of a cutout or a slot A open on one side between the support structure 50 and the spring loops 32. The axial bar 20 is arranged in the cutout A in the connection. Depending on the thickness of the second component B2, the spring loops 32 are compressed.

The second component B2 is a catch connected to a cover part or the like in the motor vehicle. Accordingly, the catch serves to fasten the cover part to the fastening clip 1 with the assistance of this catch. However, other applications are also conceivable in which components of different thickness are fastened to each other.

Figure 10:
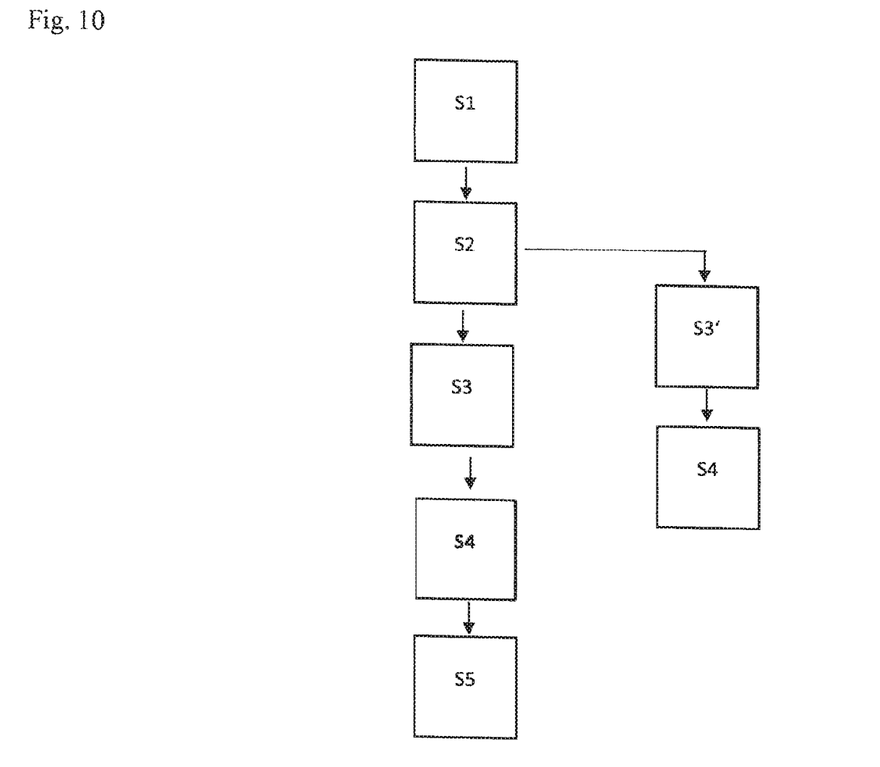
FIG. 10 shows a flowchart of an embodiment of the production method of the fastening clip according to FIG. 1.

As already mentioned above, the integral fastening clip 1 is produced by means of injection molding methods. In so doing, initially an appropriately-shaped injection mold is provided in step S1. This is formed complementary to the fastening clip 1 described above. In step S2, the fastening clip 1 is injection molded from a stable plastic (see above). According to one production route, the sealing structure 52 is injection molded in step S3 in a separate injection mold, and fastened in step S5 to the support structure 50 of the fastening clip 1. Alternatively, the sealing structure 52 is molded onto the support structure 50 in step S3' in a two-component injection molding method. In step S4, the produced fastening clip 1 is demolded from the injection mold.

In an alternative production method, the fastening clip is produced with the assistance of an additive method. In so doing, first the fastening clip 1 is defined as a single-part structure in a computer-supported data model. Subsequently, the computer-supported data model is converted in an additive method to the fastening clip 1 consisting of only one plastic. First, a thin powder layer of the plastic intended for production may be applied on an assembly platform. A laser beam melts the powder precisely at the points that are specified by the computer-supported construction or data model. Then the production platform lowers, and additional powder is applied to the already-produced plastic layer of the fastening clip 1. The plastic powder is re-melted and bonds at the defined points with the layer lying underneath. Depending on the starting material and application, the fastening clip 1 can be produced by means of stereolithography, laser sintering or 3-D printers. After producing the fastening clip 1, the separately produced sealing structure 52 is fastened to the support structure 50.

The invention claimed is:

1. A fastening clip for fastening a first component to a second component that includes an integral, elongated structure with a first and a second fastening end in which the first fastening end forms an at least one-armed independent latching structure, and the second fastening end forms a resilient clamp that each act on an intermediate support structure, wherein the second fastening end comprises a cross bar on which at least two spring loops are arranged opposite each other as resilient clamp.

2. The fastening clip according to claim 1 in which the clamp comprises at least one closed spring loop that encloses an area.

3. The fastening clip according to claim 2 that, in the interior of the at least one spring loop, has a limiting bar with which compression of the spring loop is limited to a maximum.

4. The fastening clip according to claim 2 wherein the area enclosed by the spring loop is parallel to a longitudinal axis of the fastening clip.

5. The fastening clip according to claim 4, wherein the limiting bar runs parallel to the longitudinal axis.

6. The fastening clip according to claim 2 with a support structure that is designed similar to a plate and has a sealing structure, at least axially on one side.

7. The fastening clip according to claim 2 with a latching structure that has at least one latching bar arranged at an acute angle relative to the longitudinal axis of the fastening clip and comprises an insertion chamfer and an undercut on a free end relative to a releasing direction of the latching structure.

8. The fastening clip according to claim 7 with a support structure that is designed similar to a plate and has a sealing structure, at least axially on one side, and with a latching structure that can latch a component against the sealing structure.

9. The fastening clip according to claim 1 with a support structure that is designed similar to a plate and has a sealing structure, at least axially on one side.

10. The fastening clip according to claim 1 with a latching structure that has at least one latching bar arranged at an acute angle relative to the longitudinal axis of the fastening clip and comprises an insertion chamfer and an undercut on a free end relative to a releasing direction of the latching structure.

11. The fastening clip according to claim 10 with a support structure that is designed similar to a plate and has a sealing structure, at least axially on one side, and with a latching structure that can latch a component against the sealing structure.

12. A first and a second component that are connected by a fastening clip according to claim 1.

13. A production method for a fastening clip, having the following steps:
   a. Providing an injection mold that dictates a single-part structure for the fastening clip, wherein the fastening clip includes an integral, elongated structure with a first and a second fastening end in which the first fastening end forms an at least one-armed independent latching structure, and the second fastening end forms a resilient clamp that each act on an intermediate support structure, wherein the second fastening end comprises a cross bar on which at least two spring loops are arranged opposite to each other as resilient clamp, and
   b. Injection molding the fastening clip from only one plastic.

14. The production method according to claim 13, with the further step:
   fastening a sealing structure to the support structure, or injection molding the sealing structure in the two-component injection molding method so that the sealing structure is fastened to the support structure.

15. A production method for a fastening clip, having the following steps:
   a. Providing a data model that dictates a single-part structure for the fastening clip, wherein the fastening clip includes an integral, elongated structure with a first and a second fastening end in which the first fastening end forms an at least one-armed independent latching structure, and the second fastening end forms a resilient clamp that each act on an intermediate support structure, wherein the second fastening end comprises a cross bar on which at least two spring loops are arranged opposite to each other as resilient clamp, and
   b. Generating the fastening clip based on the data model from only one plastic by an additive method.

16. A connecting method for fastening a first component to a second component with a fastening clip that includes an integral, elongated structure with a first and a second fastening end in which the first fastening end forms an at least one-armed independent latching structure, and the second fastening end forms a resilient clamp that each act on an intermediate support structure, wherein the second fastening end comprises a cross bar on which at least two spring loops are arranged opposite to each other as resilient clamp, and wherein the connecting method has the following steps:
   a. Latching the fastening clip in a component opening of the first component with the assistance of a latching arm of the latching structure, and
   b. Fastening the second component with the assistance of a cutout or a slot open on one side between the support structure and a spring loop of the resilient clamp.

17. The connecting method according to claim 16, with the further step:
   arranging an axial bar in the connection in the cutout.

18. The connecting method according to claim 17, with the further step:
   compressing the spring loop depending on a thickness of the second component.

19. The connecting method according to claim 16, with the further step:
   compressing the spring loop depending on a thickness of the second component.

* * * * *